United States Patent
Bourke et al.

(10) Patent No.: US 7,734,783 B1
(45) Date of Patent: Jun. 8, 2010

(54) SYSTEMS AND METHODS FOR DETERMINING ALLOCATIONS FOR DISTRIBUTED MULTI-SITE CONTACT CENTERS

(75) Inventors: Mike Bourke, San Francisco, CA (US); Jason Fama, Foster City, CA (US); Gal Josefsberg, Sunnyvale, CA (US)

(73) Assignee: Verint Americas Inc., Melville, NY (US)

( * ) Notice: Subject to any disclaimer, the term of this patent is extended or adjusted under 35 U.S.C. 154(b) by 1047 days.

(21) Appl. No.: 11/385,499

(22) Filed: Mar. 21, 2006

(51) Int. Cl.
 *G06F 15/173* (2006.01)
(52) U.S. Cl. .................. 709/226; 379/265.01
(58) Field of Classification Search ......... 709/223–224, 709/226; 379/265.01, 265.02, 265.05, 266.05, 379/266.06, 266.01; 705/8–10
See application file for complete search history.

(56) References Cited

U.S. PATENT DOCUMENTS

| | | | |
|---|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |

(Continued)

FOREIGN PATENT DOCUMENTS

EP  0453128 A2  10/1991

(Continued)

OTHER PUBLICATIONS

"Customer Spotlight: Navistar International," Web pae, unverified print date of Apr. 1, 2002.

(Continued)

*Primary Examiner*—Faruk Hamza

(57) ABSTRACT

Systems and methods for allocating resources, such as contact center agents, computer servers and recorders, among geographically distributed sites are provided. In this regard, a representative method comprises: creating a workload forecast, such as contact volume, and resource utilization, such as average interaction time, of events for a specified time frame as if the geographically distributed sites were co-located, performing discrete event-based simulation to assign or allocate the events to the resources as if the resources were co-located, and determining recommended allocations of the resources among the geographically distributed sites based on a relative distribution of events assigned to resources at each of the geographically distributed sites.

20 Claims, 8 Drawing Sheets

U.S. PATENT DOCUMENTS

| | | |
|---|---|---|
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,903,641 A * | 5/1999 | Tonisson ............... 379/265.12 |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 * | 11/2005 | Leamon ........................ 705/9 |
| 7,054,933 B2 * | 5/2006 | Baxley et al. ............... 709/226 |
| 7,110,525 B1 * | 9/2006 | Heller et al. ........... 379/265.11 |
| 7,225,249 B1 * | 5/2007 | Barry et al. ................. 709/227 |
| 7,406,171 B2 * | 7/2008 | Whitman, Jr. .......... 379/265.05 |
| 7,451,207 B2 * | 11/2008 | Oliver ....................... 709/224 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0138560 A1 | 6/2005 | Lee et al. |

2005/0283393 A1* 12/2005 White et al. .................. 705/8

FOREIGN PATENT DOCUMENTS

| EP | 0773687 A2 | 5/1997 |
|---|---|---|
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of AI in Education," *AMC Crossroads* vol. 1: 1-13 (Fall 1996) Web page; unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 ( © 2001).
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "Toolbook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3):5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10$^{th}$ Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst. *It's Baa-aack. How Interactive TV is Sneaking Into Your Living Room*, The AnchorDesk, May 10, 1999.

Berst. *Why Interactive TV Won't Turn You On (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-up box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld Oct. 13, 1998.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

Needle. *Will the Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, Sep. 28, 1996.

Kenny. *TV Meets Internet*, PC World Online, Mar. 28, 1996.

Linderholm. *Avatar Debuts Home Theater PC, PC* World Online, Dec. 1, 1999.

Rohde. *Gates Touts Interactive TV*, InfoWorld, Oct. 14, 1999.

Ross. *Broadcasters Use TV Signals to Send Data*, PC World Oct. 1996.

Stewart. *Interactive Television at Home: Television Meets the Internet*, Aug. 1998.

Wilson. *U.S. West Revisits Interactive TV*, Interactive Week, Nov. 28, 1999.

\* cited by examiner

SYSTEMS AND METHODS FOR DETERMINING ALLOCATIONS FOR DISTRIBUTED MULTI-SITE CONTACT CENTERS

TECHNICAL FIELD

The present invention is generally related to contact center allocation of resources.

BACKGROUND

Resource allocation and planning, including the generation of schedules for employees, is a complex problem for enterprises. Telephone call center resource allocation and scheduling is an example of a problem with a large number of variables. Variables include contact volume at a particular time of day, available staff, skills of various staff members, call type (e.g., new order call and customer service call), and number of call queues, where a call queue may be assigned a particular call type. A basic goal of call center scheduling is to minimize the cost of agents available to answer calls while maximizing service.

Traditionally, call center scheduling is performed by forecasting incoming contact volumes and estimating average talk times for each time period based on past history and other measures. These values are then correlated to produce a schedule. However, due to the number of variables that may affect the suitability of a schedule, many schedules need to be evaluated.

Recently, call centers have evolved into "contact centers" in which the agent's contact with the customer can be through many contact media. For example, a multi-contact call center may handle telephone, email, web callback, web chat, fax, and voice over internet protocol. Therefore, in addition to variation in the types of calls (e.g., service call, order call), modern contact centers have the complication of variation in contact media. The variation in contact media adds complexity to the agent scheduling process.

Additional complexity results when multiple sites are involved. That is, multiple geographically distributed call centers may be owned by a single organization, or calls may be distributed to multiple locations dependent on whether a contact is for technical support, sales, etc.

SUMMARY

Systems and methods for allocating resources, e.g., contact center agents, among geographically distributed sites are provided. In this regard, an exemplary embodiment of such a method comprises: creating a workload forecast, such as contact volume and average handle, resolution, interaction and/or order/purchase fulfillment time, of events for a specified time frame, such as hours, days, week, months, quarters and/or years, as if the geographically distributed sites were co-located, performing discrete event-based simulation to assign the events to the contact center resource(s) as if at least a portion of the total contact center resources were co-located, and determining recommended allocations of the contact center resources among the geographically distributed sites based on a relative distribution of events expected, forecasted, simulated or assigned to contact center resources at each of the geographically distributed sites. In addition to time, requirements can further include other operational constraints of the sites, including, for example, network bandwidth.

An exemplary embodiment of a system for allocating contact/support center resources, such as agents, servers, computers, databases, recorders (including, among others, TDM, VoIP and/or wireless recorders), administrative staff, customer services personnel, supervisors, managers, marketers, cross-sellers, supplies and other logistical resources involved in the operations of point of contact centers, including contact or customer support centers, back office or support centers, retailing and banking centers, comprises: a forecasting system configured to create a workload forecast, such as volume, peak time, low time, average volume, static and dynamic volume, including requirements per hour (including minutes and seconds), day, week, month, quarter and/or year, with such requirement including, for example, voice, messenger chat, email, and direct contact channels of communication, and average handle, resolution and/or transactional time forecast of events for a specified or predetermined time frame, schedule and/or campaign, as if the geographically distributed resources or sites were co-located, a simulation system configured to perform discrete event-based simulation to assign the events to the resource(s) (for example, contact center agents) as if the resource were co-located, and an analysis system configured to determine recommended allocations of resources among the geographically distributed sites based on a relative distribution of events expected, forecasted or simulated for the center and/or assigned to resource (s) at each of the geographically distributed sites Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications and equivalents.

DETAILED DESCRIPTION

Figure 1:
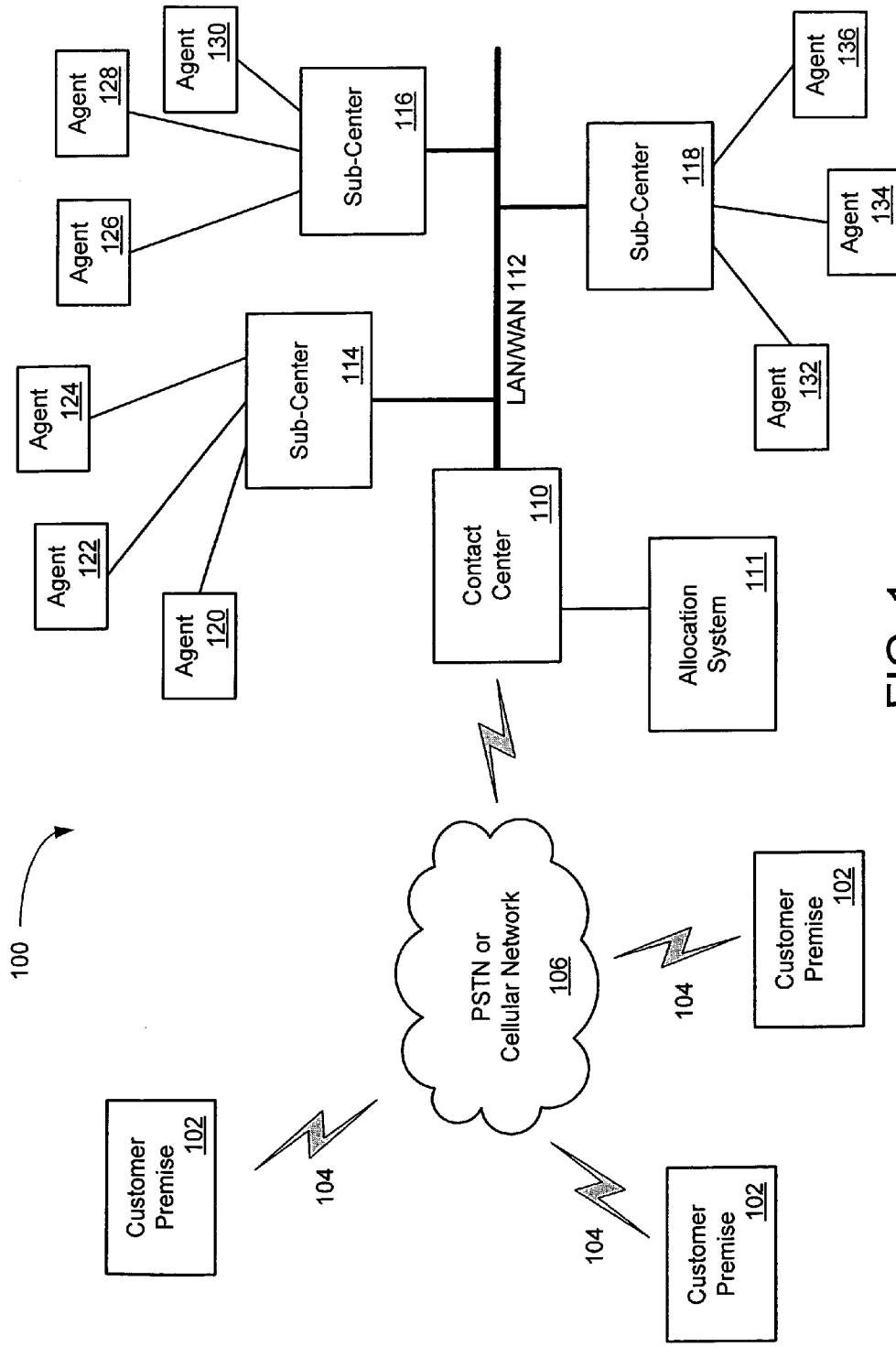
FIG. 1 is a schematic diagram illustrating an exemplary embodiment of a system for distributing events, such as contact/support center events, according to recommended allocations of resources, such as contact center agents.

Disclosed herein are systems and methods for determining recommendations for the allocation of resources, such as call center agents, retailers or bankers. In particular, the allocation of resources can be achieved using discrete event-based simulations that perform allocations on multiple distributed sites as if the resources were not distributed. Recommended allocations are based on a relative distribution, e.g. percentages, of events, such as customer calls, inquiries, purchases and other transactional and operational events, for each site in accordance with the resource to which the simulation assigned the events. More generally though, the systems and methods of the present invention can be deployed or utilized in allocating contact/support center resources, such as agents, servers, computers, databases, recorders (including, among others, TDM, VoIP and/or wireless recorders), administrative staff, customer services personnel, supervisors, managers, marketers, cross-sellers, supplies and other logistical resources involved in the operations of point of contact centers, including contact or customer support centers, back office or support centers, retailing and banking centers.

An ideal system for distributing events to multiple sites would be a system that could analyze every available site for any available resource located at any of the available sites. After location of an available resource, such a system would route the event to that resource regardless of that resource's geographical location. Thus, although the contact center is a virtual center, the system would distribute events as if the contact center were one large contact center. Such efficiency, however, is difficult to attain. Typically, contact centers operate on preset allocations of events for a particular time frame. The equipment costs for analyzing all available sites and routing events accordingly can be very expensive. By comparison, equipment costs for routing defined percentages of events is currently preferable. With preset allocations, a distributed site essentially operates as an independent site that knows what volume of events to expect and, thus, is able to schedule staffing, and other resources, accordingly.

The disclosed systems for determining allocations for distributed multi-site contact centers provide recommended allocations of contact center resources, such as agents, based on simulations that utilize virtual contact centers. Statistical information based on existing work flow management (WFM) data are used to create a workload forecast of events for contact volume data and average handle times. A contact volume forecast is the number of events forecast for a certain time interval. An average handle time forecast is the response time required per event. In conjunction with agent schedules and other agent rules, randomly distributed contact arrival events are created based on the WFM data. A discrete event-based simulation then routes the events to available agents as if they were assigned to a non-distributed or virtual contact center. Recommended allocations for the various sites are then calculated based on the agents to which the events were assigned.

Exemplary systems are first discussed with reference to the figures. Although these systems are described in detail, they are provided for purposes of illustration only and various modifications are feasible. After the exemplary systems have been described, examples of recommended allocations are provided to explain the manner in which the scheduling and allocation of the call center agents can be achieved.

Referring now in more detail to the figures, FIG. 1 is a schematic diagram illustrating an exemplary embodiment of a system for distributing events according to recommended allocations of resources, such as contact center agents. The system 100 comprises one or more customer premises 102. The customer premise 102 includes, for example but not limited to, telephones, cellular phones and computing devices. Customer premises 102 communicate with a network 106 (e.g., PSTN and/or cellular) that communicates with a contact center 110. In FIG. 1 the contact center 110 is shown connected through a network 112 (e.g., local area network (LAN) or wide area network (WAN) or virtual private network (VPN)) to various sub-centers 114, 116 and 118. Each sub-center 114, 116 and 118, has multiple contact center agents 120, 122, 124, 126, 128, 130, 132, 134 and 136. It should be noted that the number of sub-centers 114, 116 and 118, may vary according to the requirements of the contact center 110. Typically, there will be at least two sites (sub-centers). Of course, the number of contact center agents 120 et al., will also vary according to the recommended allocations for each sub-center 114, 116, 118. Hereafter, unless two different contact center agents are discussed, references to a generic contact center agent or to generic contact center agents will refer to contact center agent 120. Also, for purposes of illustration, the discussion to follow focuses on the allocation of contact center agents 120, though the contact center resources could just as likely be servers, computers, databases, recorders (including, among others, TDM, VoIp and/or wireless recorders), administrative staff, customer services personnel, supervisors, managers, marketers, cross-sellers, supplies and other logistical resources involved in the operations of point of contact centers, including contact or customer support centers, back office or support centers, retailing and banking centers.

Events, such as a call 104, to customer support are placed from a customer premise 102 through the network 106 to the contact center 110. The customer initiates the event with no regard as to where the contact center agent 120 is actually located. The event is routed to the next available contact center agent 120 by the contact center 110 in accordance with recommended allocations provided to the contact center 110 from an allocation system 111. A contact center agent 120 utilizes computing devices (not shown) such as, for instance, desktop computers (PCs) or Macintosh computers that can, if necessary, be connected to communication devices, such as a headset, microphones, and headphones, among others.

Figure 2:
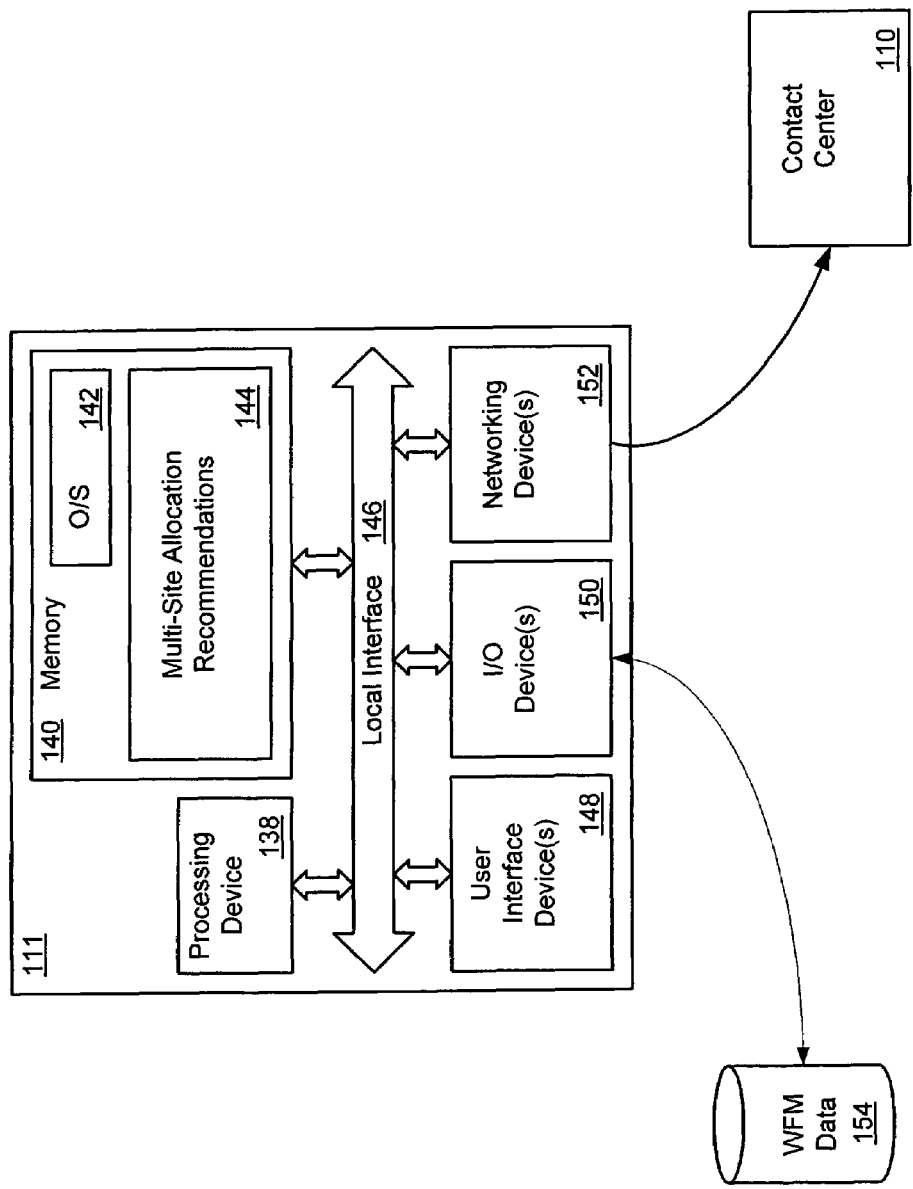
FIG. 2 is a schematic diagram illustrating an embodiment of a computer-implemented system that can be used for determining recommended allocations of resources, such as contact center agents, utilized in FIG. 1.

FIG. 2 is a schematic diagram illustrating an exemplary embodiment of a computer-implemented allocation system 111 that can be used for determining recommended allocations of contact center agents 120. It should be noted that the allocation system 111 could be located in the contact center 110 or at a location connected to the contact center via a network such as the network 112 or the Internet, among others. Generally, the allocation system 111 includes a processing device 138, memory 140, user interface devices 148, input/output devices (I/O) 150 and networking devices 152, each of which is connected to local interface 146. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among aforementioned components. The processor may be a hardware device for executing software, particularly software stored in memory.

The processing device 138 can be any custom made or commercially available processor, a central processing unit (CPU) or an auxiliary processor among several processors associated with the allocation system 111, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory (as well as various other components) can have a distributed architecture, where various components are situated remote from one another, but can be accessed by the processing device 138. Additionally, memory 140 can also include an operating system 142, as well as instructions associated with various subsystems, such as a multi-site allocation recommendation system 144.

The software in memory 140 may include one or more separate programs, each of which includes an ordered listing of executable instructions for implementing logical functions. In this regard, a nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in hand-held computers or personal data assistants (PDAs) (e.g., PalmOS® available from Palm® Computing, Inc., and Windows CE® available from Microsoft® Corporation). The operating system 142 can be configured to control the execution of other computer programs and provides scheduling, input-communication control, file and data management, memory management, and communication control and/or related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory 140, so as to operate properly in connection with the operating system 142.

When the allocation system 111 is in operation, the processing device 138 is configured to execute software stored within the memory 140, to communicate data to and from the memory 140, and to generally control operations of the allocation system 111 pursuant to the software. Software in memory 140, in whole or in part, is read by the processing device 138, perhaps buffered, and then executed. The allocation system 111 accesses WFM data from a WFM database 154 through I/O device 150. Multi-site allocation recommendations 144 are determined and made available to the contact center 110 through a networking device 152.

Figure 3:
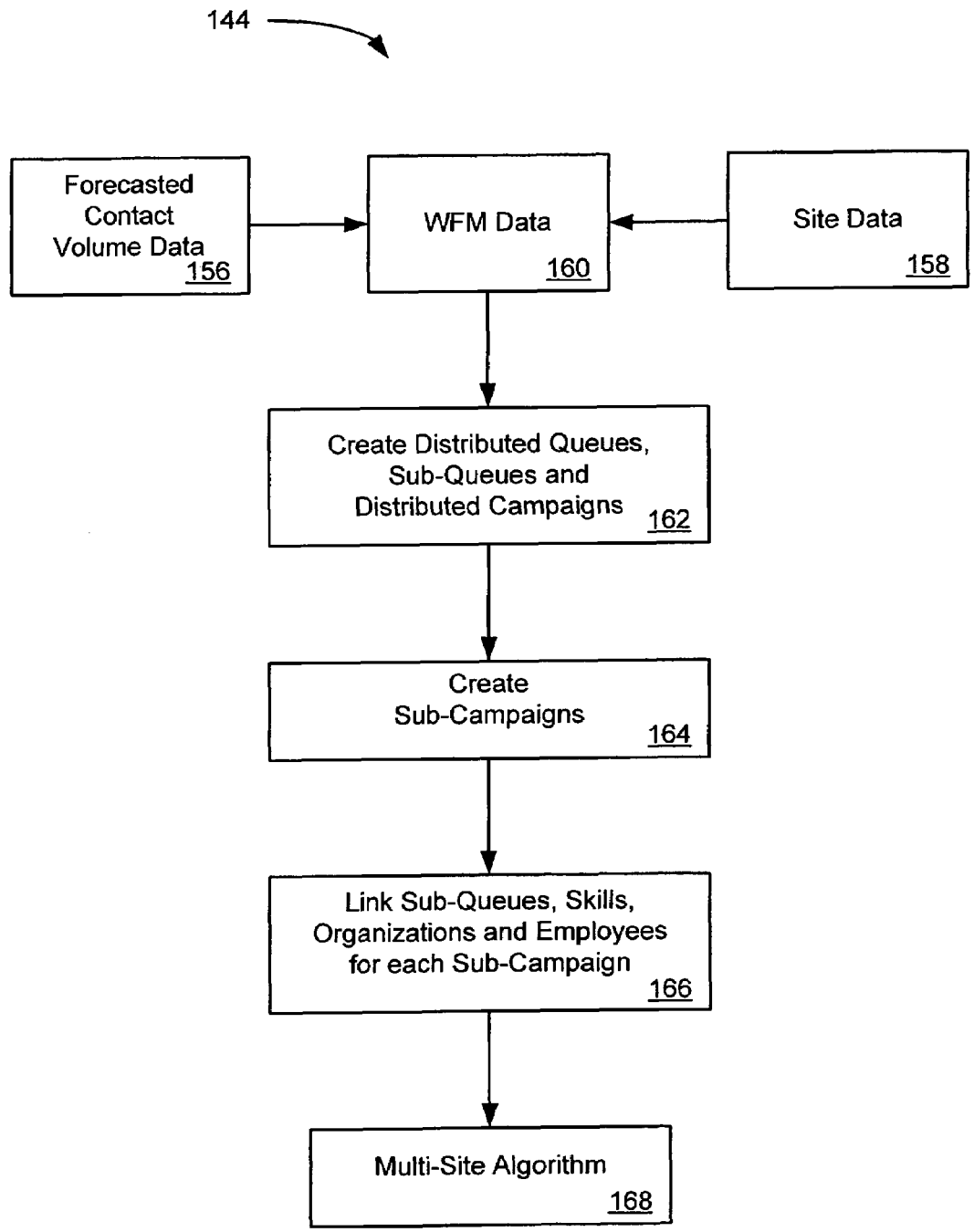
FIG. 3 is a flowchart illustrating functionality (or method steps) that can be performed by an embodiment of a system according to FIG. 2 to create recommended allocations of resources, such as contact center agents, for use in the system of FIG. 1.

FIG. 3 is a flowchart illustrating functionality associated with the embodiment of the system of FIG. 2. Specifically, the functionality depicted in FIG. 3 is associated with the multi-site allocation recommendations system 144. In this regard, the functionality begins by assimilating WFM data 160 from forecasted call volume data 156 and other site data 158. Examples of other site data would include employees, work schedules, time off preferences, event type priorities, etc. The WFM data could be retrieved from a WFM database 154 (see FIG. 2) and processed by the processing device 138 (see FIG. 2) for use in the multi-site allocation recommendations system 144. Forecasted contact volume data 156 is made up of a contact volume for some period of time and an average interaction time forecast. As a non-limiting example, a contact volume forecast could be the reception of 25 customer support calls over a 15 minute window from 9:00 A.M. to 9:15 A.M. The time window could, of course be adjusted to suit the particular circumstance and/or other requirements. Average interaction time forecast, as a non-limiting example, could be that an average sales call requires two minutes and forty-five seconds of contact center agent 120 support. Of course, different type events would require different levels of interaction time and/or follow-up time that could also be included in the forecast. The contact volume and average interaction time forecast is an attempt to forecast the total incoming contact volume and the total time required to handle that contact volume at the top level, being the distributed centralized level. The WFM history available enables the allocation system 111 to forecast the incoming workload that must be distributed to the available sub-centers 114, 116 and 118.

Block 162 shows the creation of distributed queues, sub-queues and distributed campaigns. A distributed campaign is an entire operation, while a distributed queue includes events related to that operation. A distributed campaign could have more than one distributed queue. As a non-limiting example, when a distributed campaign involves a particular product, a distributed queue could entail a stream of events related to that product. In block 164, sub-campaigns are created for each distributed campaign. Sub-campaigns are a portion of the entire operation including sub-queues and employees. Sub-queues are derived from a distributed queue and are a stream of events routed to a particular sub-center. An event from the sub-queue is distributed to the employees or agents available to handle that event. In block 166, for each sub-campaign, the sub-queues, skills, organizations and employees are linked to that sub-campaign. Finally, the multi-site algorithm is applied in block 168.

Within a distributed campaign, events are routed from a distributed queue through sub-queues to various sub-centers and then to individual agents. Sub-campaigns comprise various sub-queues as input streams of events to a sub-center and the contact center agents assigned to that sub-center. The queues overlap with the campaigns based on agent availability and capability.

Figure 4:
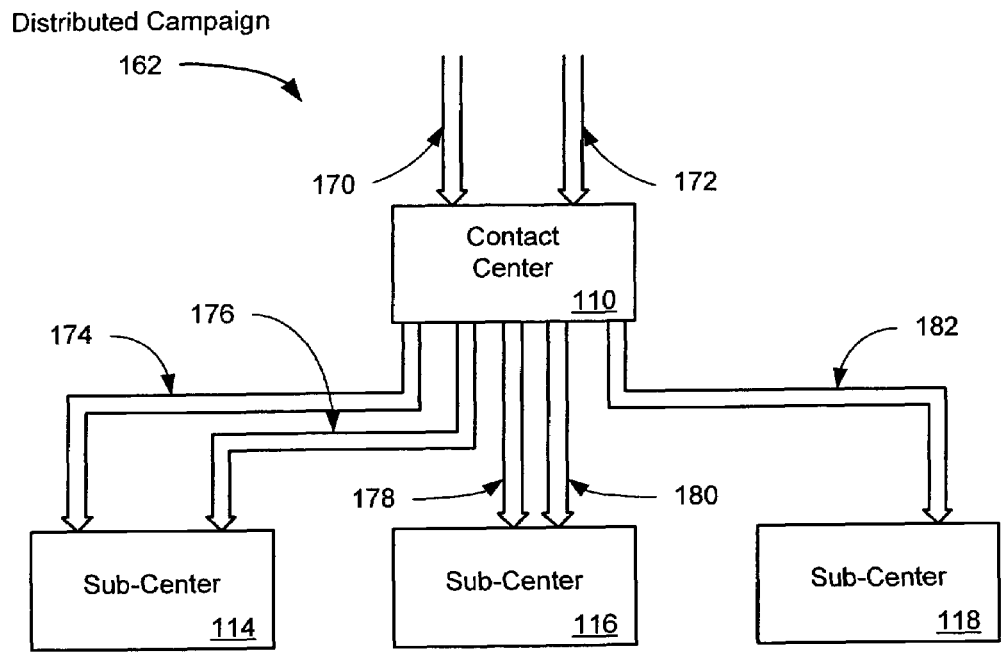
FIG. 4 is a diagram illustrating a distributed campaign according to FIG. 3.

FIG. 4 illustrates an example of a distributed campaign such as created in block 162. One or more distributed queues 170, 172 stream into the contact center 110. A distributed queue 170, 172 is a centralized incoming stream of events coming into the contact center 110 to be distributed to some sub-center 114, 116, 118. The event could be a phone call, voice over internet protocol or email, among others.

FIG. 4 shows events distributed to sub-center 114 through sub-queues 174, 176. Likewise events are shown distributed to sub-center 116 through sub-queues 178, 180 and events are shown distributed to sub-center 118 through sub-queue 182.

As a non-limiting example, distributed queue 170 could include phone calls for customer support and the contact center agents 120 specializing in customer support might be located at sub-center 114 and at sub-center 116. The customer support events would be routed through sub-queue 174 to sub-center 114 and through sub-queue 178 to sub-center 116. Further, the customer support events might be directed toward different types of support issues, for example installation issues and technical support issues. The sub-queues could be directed toward specific types of events. Installation issues could be routed through sub-queue 174 to sub-center 114 and sub-queue 178 to sub-center 116. Technical support issues could be routed through sub-queue 176 to sub-center 114 and sub-queue 180 to sub-center 116. A contact center agent 120 at each sub-center would receive events related to their specific skill-set. Notably, a contact center agent 120 could have multiple skill-sets such that a single contact center agent 120 could handle events related to both installation issues and technical support issues in this example. Additionally, distributed queue 172 could include phone calls for sales and the contact center agent(s) 120 specializing in sales might be located at sub-center 118. The sales events would be routed through sub-queue 182 to sub-center 118.

Figure 5:
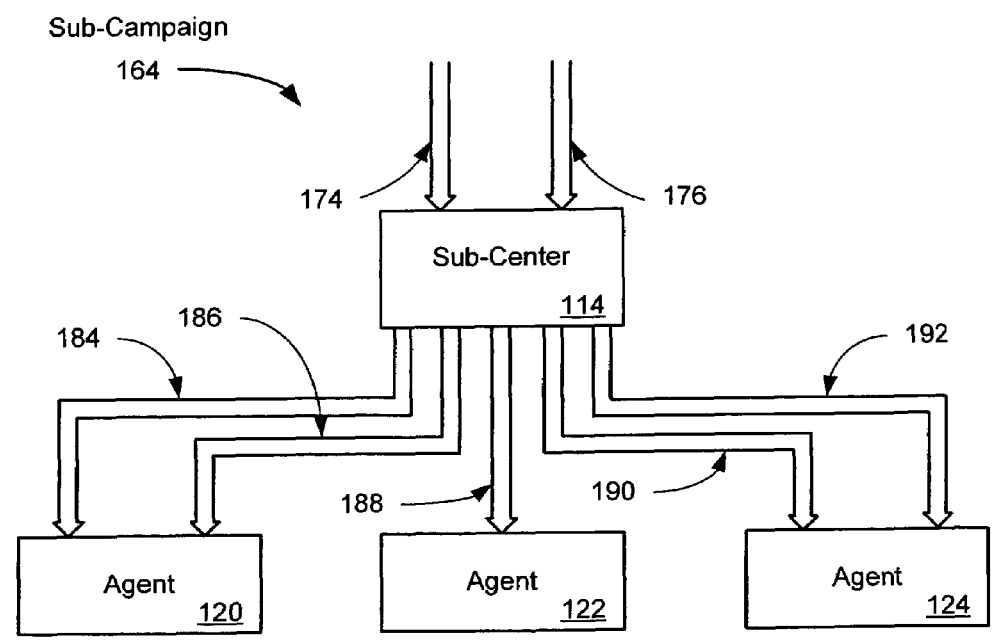
FIG. 5 is a diagram illustrating a sub-campaign from FIG. 4.

FIG. 5 illustrates a sub-campaign as created in block 164. One or more sub-queues 174, 176 stream into the sub-center 114. Similarly, at least one sub-queue streams into each sub-center. A sub-queue 174, 176 is a centralized incoming stream of events coming into the sub-center 114 to be distributed to contact center agents 120, 122 and 124. Of course, the number of contact center agents 120 varies with each contact center in accordance with actual and recommended allocations. FIG. 5 shows events 184, 186 distributed to contact center agent 120. Likewise events 188 are shown distributed to contact center agent 122 and events 190, 192 are shown distributed to contact center agent 124. Notably, a sub-center 114 can receive different streams of events, for example, from sub-queue 174 and sub queue 176, and a contact center agent 120 can receive events from a single sub-queue 174 or from multiple sub-queues 174, 176. Thus, event 184 to contact center agent 120 could derive from sub-queue 174 while event 186 could derive from sub-queue 176.

Figure 6:
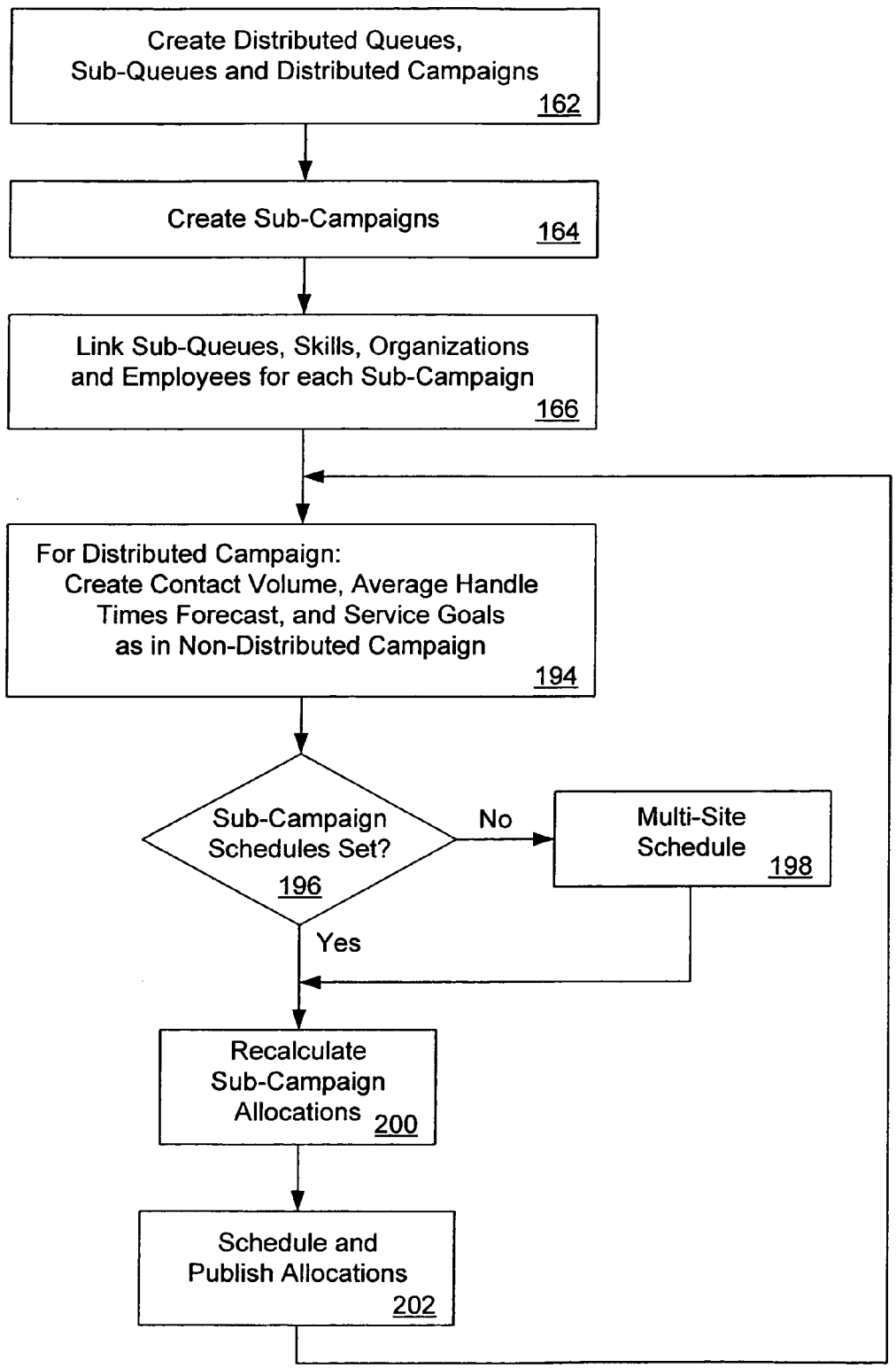
FIG. 6 is a flowchart illustrating determination of recommended allocations by the system in FIG. 2.

FIG. 6 is a flowchart illustrating an exemplary process for determination of recommended allocations by the allocation system 111 in FIG. 2. Specifically, the functionality depicted in FIG. 6 provides greater detail of the flowchart in FIG. 3 associated with the multi-site allocation recommendations system 144. In block 162 distributed queues, sub-queues and distributed campaigns are created. In block 164, sub-campaigns are created for each distributed campaign. In block 166, for each sub-campaign, the sub-queues, skills, organizations and employees are linked to that sub-campaign.

Next, a multi-site algorithm is applied to the distributed campaign using a virtual contact center. The WFM data 160 is used to create contact volume, average interaction time forecasts and service goals in block 194 for the distributed campaign. The forecast is for total incoming event volume and the total time it will take to handle that event volume at the distributed centralized level. The goal is to forecast the workload that is coming in to the contact center 110 and that must be distributed to the sub-centers 114, 116, 118. The forecast is processed as if the distributed campaign were a virtual (non-distributed) campaign. A non-distributed or virtual campaign assumes that all contact center agent(s) 120 are in one location. The next step 196 determines whether schedules have been set in each sub-campaign. If the contact center agent(s) 120 in a sub-campaign have not been assigned schedules, then a multi-site scheduling program is executed in block 198 (see FIG. 7). Otherwise, if scheduling is already set, then the sub-campaign allocations are calculated in block 200 (see FIG. 8) as if all contact center agents 120 are in a virtual environment. This allocation assumes that an event could be routed to any available contact center agent 120 regardless of the actual sub-center 114, 116 and 118 in which that contact center agent 120 is actually located.

A discrete event-based simulation is performed to achieve allocations. Many simulations can be performed and then averaged together. The results are then analyzed in block 202 to determine to which sub-center the events were routed according to which contact center agents 120 received the event. The results could signify that for a certain time period, a particular percentage of calls were routed to the contact center agent(s) 120 at sub-center 114. For example, if 17% of events go to sub-center 114, 38% of events go to sub-center 116 and the remaining events go to sub-center 118, then it would be recommended that sub-center 114 will receive 17% of the routed events and should staff accordingly.

Figure 7:
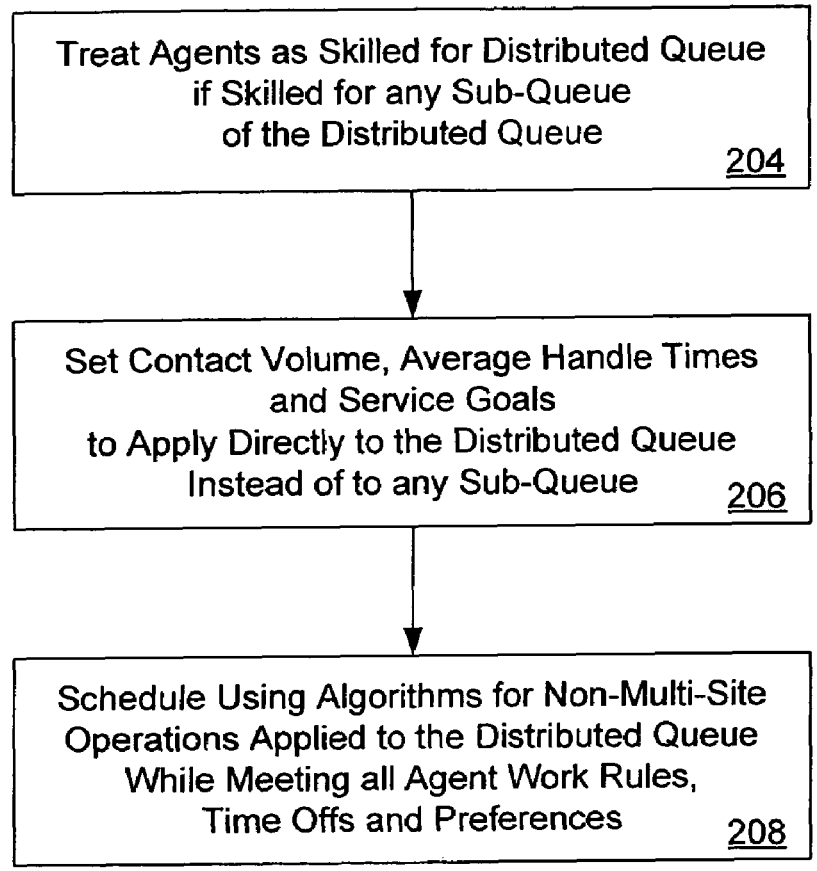
FIG. 7 is a flowchart illustrating the multi-scheduling algorithm of FIG. 6.

FIG. 7 is a flowchart illustrating an embodiment of a multi-scheduling algorithm such as used in block 198 of FIG. 6. The multi-scheduling algorithm is performed such as when there is no schedule available for the contact center agents 120. A sub-center schedule, or partial schedule, is used if available. The multi-scheduling algorithm begins at block 204 by treating contact center agent(s) 120 as suitably skilled for the distributed queue if they are skilled for any sub-queue of the distributed queue. For example, in block 206, the forecasts for contact volume, average interaction times and service goals are set to apply directly to the distributed queue instead of to any sub-queue. Finally, in block 208, the contact center agents 120 are scheduled using algorithms for non-multi-site operations applied to the distributed queue while also meeting contact center agent 120 work rules, time-off requirements and other preferences. The scheduling system operates as if all contact center agents 120 are available at one site, or a virtual center. The resulting schedule is the schedule that would be available in a virtual center. That schedule is then applied to the sub-centers for determining the recommended allocations.

In an alternative embodiment, contact center systems may also account for scheduled training of contact center agents 120. In the system 100 (see FIG. 1), additional WFM capability may include a learning component that allows a contact center manager to develop training lessons for and assign lessons to contact center agents 120. The learning component provides automated training processes by identifying, scheduling, and delivering online learning directly to contact center agent 120 desktops. The lesson content can include recorded interactions, which can be used to create a library of best practices for training agents and other personnel. Using actual interactions, a contact center 110 can develop E-learning content specific to the organization. In an enhancement, these training lessons can include assessments to help track and measure agent performance, skill acquisition, and knowledge retention.

The learning component can also deliver targeted learning sessions over a network, using e-mail, or a hyperlink to a Web site, or directly to the agent desktop. Supervisors can select the appropriate training sessions from a library of courseware or create sessions themselves using a contact editing feature. Then supervisors can assign course material and monitor completion automatically.

When creating a schedule for a multi-site contact center 110, the multi-site scheduling algorithm will include training events, in addition to shift assignments, breaks and other preferences. Thus, scheduling for multiple sites also includes the scheduling of training events for the individual agents at the individual sites. If the learning sessions are pre-scheduled, then the multi-site scheduling algorithm and/or the discrete event-based simulation will take the learning sessions into account as training events. Alternatively, the training events could be considered along with other events in the discrete event-based simulation discussed in greater detail below.

In addition to scheduled training of contact center agents 120, integrated workforce optimization platforms can also integrate other capabilities in support of a greater customer service strategy: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. These five segments can become part of an interwoven and interoperable solution, enabling contact centers to transition from reactive cost centers to proactive, information-rich departments that deliver strategic value to the organization. Workforce optimization is discussed in greater detail in the U.S. patent application entitled "Systems and Methods for Workforce Optimization," filed Feb. 22, 2006, and assigned Ser. No. 11/359,356, which is entirely incorporated herein by reference.

In a non-limiting example of integration with other workforce optimization capabilities, contact center agent 120 allocations could be compared against actual event distribution to determine whether the allocations were satisfactory. Other integration points with workforce optimization capabilities may also be useful in context of the allocation and scheduling of contact center agents.

Figure 8:
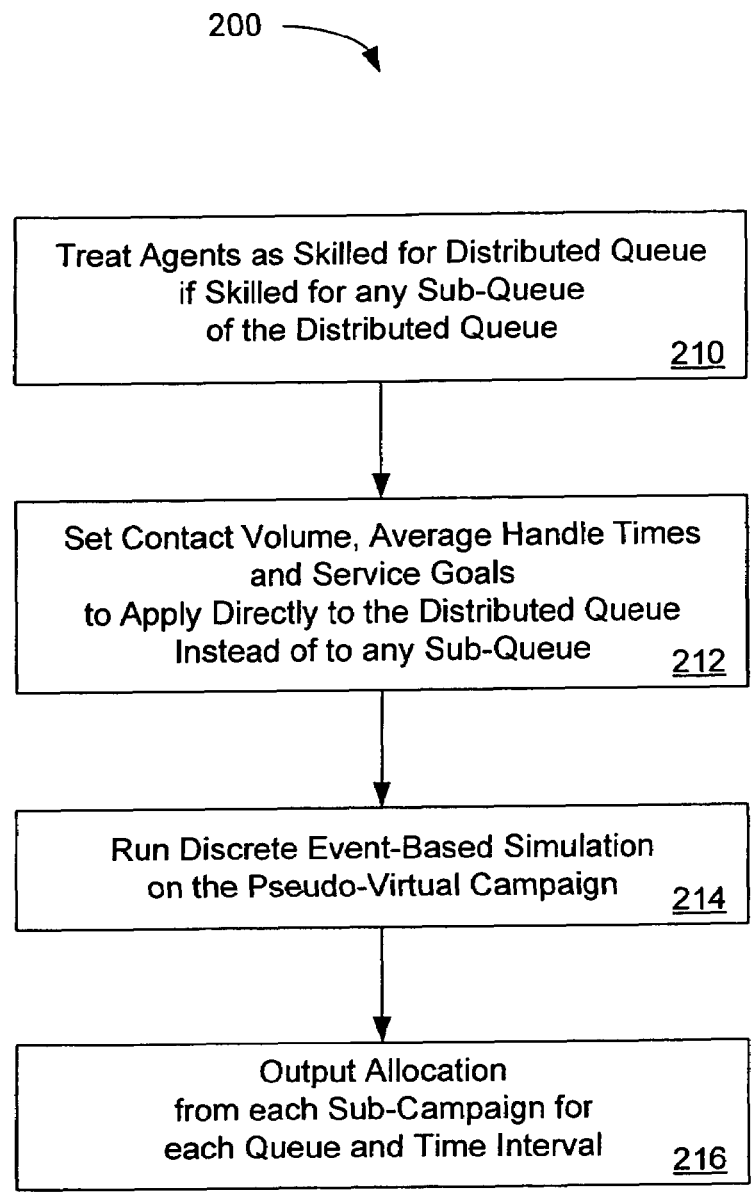
FIG. 8 is a flowchart illustrating the calculation of sub-campaign allocations of FIG. 6.

FIG. 8 is a flowchart illustrating an embodiment of the calculation of sub-campaign allocations of FIG. 6. The sub-campaign allocation algorithm 200 preferably is performed once the contact center agents' 120 schedule is set. If there is no schedule, then the sub-campaign allocation algorithm 200 is run after the multi-site scheduling algorithm. The sub-campaign allocation algorithm 200 begins at block 210 by treating contact center agents 120 as suitably skilled for the distributed queue if they are skilled for any sub-queue of the distributed queue. In block 212, the forecasts for contact volume, average interaction times and service goals are set to apply directly to the distributed queue instead of to any sub-queue. In block 214, a discrete event-based simulation (discussed in greater detail below) is performed on the pseudo-virtual campaign. Events are routed to available contact center agents 120 as if they are in the same location. In block 216, allocation recommendations are made for each sub-campaign of a distributed queue and time interval.

In an alternative embodiment, training events may also be included along with events during the calculation of sub-campaign allocations. Training events, or learning sessions, may be included along with other qualifications limiting the availability of the contact center agents 120.

Figure 9:
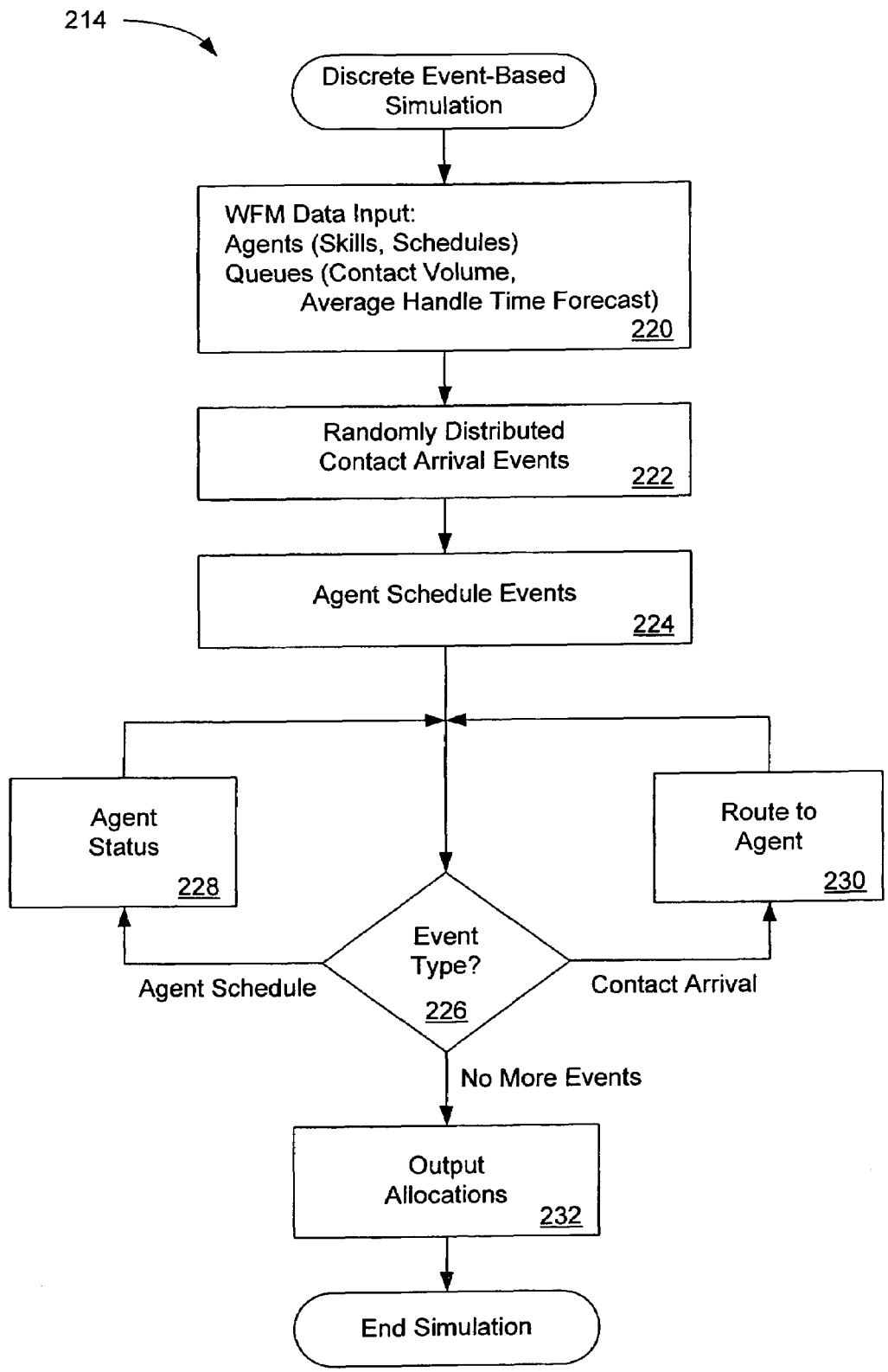
FIG. 9 is a flowchart illustrating the discrete event-based simulation of FIG. 8.

FIG. 9 is a flowchart illustrating an embodiment of a discrete event-based simulation 214 as in FIG. 8. Multiple WFM data input parameters are available for the discrete event-based simulation 214. Block 220 shows that parameters related to the contact center agent 120, such as agent skills and agent schedules, are input. Additionally, for each distributed queue, the contact volume and average interaction time forecast are also available as inputs. Block 222 shows that randomly distributed event arrival times are created based on the contact volume and average interaction times.

As a non-limiting example, if the contact volume and average interaction time forecast indicates that between 8:00 A.M. and 9:00 A.M. the contact center 110 expects to receive ten events that are expected to require two minutes on average, then a random distribution will be created for the events during that time interval.

Block 224 shows that contact center agent 120 schedule events are created for changes in the contact center agent 120 availability. Schedule events for a contact center agent 120 could correspond to arrival, meeting, lunch breaks and departure, among others. A contact center agent 120 changing from one status to another is considered an agent schedule event.

Block 226 shows that for each event, the discrete event-based simulation 214 determines whether it is a contact arrival event or an agent schedule event. For the arrival of an event, as shown in block 230, the event is routed to a contact center agent 120. The discrete event-based simulation 214 finds an unoccupied contact center agent 120, routes the event to the contact center agent 120 and marks the contact center agent 120 occupied for the duration of the event. When an event is processed, the discrete event-based simulation 214 records to which contact center agent 120 the event was routed. For an agent schedule event, as shown in block 228, the discrete event-based simulation 214 changes the contact center agent's 120 availability status from one state to another. The contact center agent's 120 status could be as simple as available state versus unavailable state. Of course, other states could also be set dependent upon contact center requirements.

The discrete event-based simulation 214 continues until all events are processed. After all events are processed, the allocations are analyzed to determine what percentage of events went to contact center agents 120 of the respective sub-centers. Even though the discrete event-based simulation 214 performed the simulation as if all contact center agents 120 were present in a non-distributed contact center, the percentage distribution is calculated based on the contact center to which the contact center agents 120 are assigned. Multiple passes of the discrete event-based simulation 214 can be performed to determine average percentages of event distribution. The average distribution can then be used for recommended allocations to the various sub-centers as shown in block 232.

It should be noted that many available simulators are well known in the art and could be utilized to perform the discrete event-based simulation 214. The emphasis is on the simulation rather than the simulator itself. The discrete event-based simulation 214 treats the allocation of events as if the sub-centers, and thus the contact center agents 120 are not distributed.

The various sub-centers may keep the recommended allocation as provided by the allocation system 111 and adjust staff for the sub-campaign according to the percentage of events expected during the time accounted for by the simulation. Additionally, the sub-center may adjust the staffing and re-execute the allocation system 111 for new recommendations based on the adjusted staffing. Any change to the forecast or to the contact center agents 120 will affect the recommended allocations since the allocation system 111 treats the distributed campaign as one contact center. An iterative process of creating recommended allocations and then sub-centers adjusting the forecast and/or agents allows convergence to an optimal staffing.

It should be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain or store the program for use by or in connection with the instruction execution system, apparatus, or device. The computer readable medium can be, for example but not limited to, an electronic, magnetic, optical, electromagnetic, or semiconductor system, apparatus, or device. More specific examples (a nonexhaustive list) of the computer-readable medium could include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, having thus described the invention, at least the following is claimed:

1. A method for allocating contact center resources among geographically distributed sites, comprising:
   in an allocation system, creating a workload forecast of events for a specified time frame, wherein, in creating the workload forecast, the allocation system assumes that the geographically distributed sites are co-located;
   in the allocation system, performing a discrete event-based simulation utilizing virtual contact centers to allocate the events to the contact center resources, wherein, in performing the discrete event-based simulation, the allocation system assumes that the contact center resources are co-located;
   in the allocation system, analyzing results of the discrete event-based simulation to determine a relative distribution of the events allocated to the contact center resources at each of the geographically distributed sites;
   in the allocation system, creating at least one distributed campaign, wherein each distributed campaign includes at least two sub-centers geographically dispersed from a contact center, and wherein each sub-center includes at least one of the contact center resources;
   in the allocation system, creating at least one distributed queue for each distributed campaign, wherein each distributed queue comprises at least a portion of the events as an input stream to the contact center; and
   in the allocation system, determining recommended allocations of the contact center resources among the geographically distributed sites based on the relative distribution of the events allocated to contact center resources at each of the geographically distributed sites.

2. The method of claim 1, wherein the workload forecast is derived from statistics regarding resources utilized for the specified time frame for each of the geographically distributed sites.

3. The method of claim 2, further comprising randomly distributing the events within the specified time frame to create the workload forecast.

4. The method of claim 1, further comprising creating schedules for the contact center resources wherein, in creating the schedules, the allocation system assumes that the contact center resources are co-located, and wherein creating the schedules occurs prior to performing the discrete event-based simulation.

5. The method of claim 1, further comprising creating at least one training event, wherein at least one contact center resource is scheduled for the at least one training event, and wherein creating the at least one training event occurs prior to performing the discrete event-based simulation.

6. The method of claim 1, wherein the workload forecast comprises a contact volume for a period of time and an average interaction time forecast.

7. The method of claim 1, wherein the at least one distributed campaign involves a particular product, and the at least one distributed queue comprises a stream of events associated with the particular product.

8. The method of claim 1, further comprising creating at least one sub-campaign for each distributed campaign, wherein the sub-campaign comprises one of the sub-centers and the contact center resources assigned to that sub-center.

9. The method of claim 8, further comprising creating at least one sub-queue for each distributed campaign, wherein the sub-queue is derived from one of the distributed queues, the sub-queue further comprising at least a portion of the events as an input stream to one of the sub-centers.

10. The method of claim 9, further comprising treating a contact center resource as skilled to handle events of the at least one distributed queue if the contact center resource is skilled to handle any event in any sub-queue deriving from the at least one distributed queue.

11. A system for allocating contact center agents among geographically distributed sites, comprising:
   a processing device configured to execute a forecasting system configured to create a contact volume and average interaction time forecast of events for a specified time frame, wherein the forecasting system, to create the contact volume and average interaction time forecast of events, assumes that the geographically distributed sites are co-located;
   the processing device configured to execute a simulation system configured to perform a discrete event-based simulation utilizing virtual contact centers to assign the events to the contact center agents, wherein the simulation system, to perform the discrete event-based simulation, assumes that the contact center agents are co-located;

the processing device configured to execute an analysis system configured to analyze results of the discrete event-based simulation to determine a relative distribution of the events allocated to the contact center resources at each of the geographically distributed sites;

the processing device configured to create at least one distributed campaign, wherein each distributed campaign includes at least two sub-centers geographically dispersed from a contact center, and wherein each sub-center includes at least one of the contact center agents;

the processing device configured to create at least one distributed queue for each distributed campaign, wherein each distributed queue comprises at least a portion of the events as an input stream to the contact center; and the processing device configured to execute the analysis system configured to determine recommended allocations of contact center agents among the geographically distributed sites based on the relative distribution of events assigned to contact center agents at each of the geographically distributed sites.

12. The system of claim 11, wherein the contact volume and average interaction time forecast is derived from statistics regarding contact volume for the specified time frame for each of the geographically distributed sites.

13. The system of claim 12, further comprising means for randomly distributing the events within the specified time frame to create the contact volume and average interaction time forecast.

14. The system of claim 11, further comprising means for creating schedules for the contact center agents, wherein the means for creating the schedules for the contact center agents assumes that the contact center agents are co-located.

15. The system of claim 11, further comprising means for creating at least one training event, wherein at least one contact center agent is scheduled for the at least one training event, and wherein creating the at least one training event occurs prior to the simulation system performing the discrete event-based simulation.

16. The system of claim 11, wherein the at least one distributed campaign involves a particular product, and the at least one distributed queue comprises a stream of events associated with the particular product.

17. The system of claim 11, further comprising means for creating at least one sub-campaign for each distributed campaign, wherein the sub-campaign comprises one of the sub-centers and the contact center agents assigned to that sub-center.

18. The system of claim 17, further comprising means for creating at least one sub-queue for each distributed campaign, wherein the sub-queue is derived from one of the distributed queues, the sub-queue further comprising at least a portion of the events as an input stream to one of the sub-centers.

19. The system of claim 18, further comprising means for treating a contact center agent as skilled to handle events of the at least one distributed queue if the contact center agent is skilled to handle any event in any sub queue deriving from the at least one distributed queue.

20. A memory having a computer program stored thereon, the computer program comprising computer-executable instructions which are executed by a processor to perform steps comprising:

in an instruction execution system, creating a contact volume and average handle times forecast of events for a specified time frame, wherein, in creating the contact volume and average handle times forecast of events, the instruction execution system assumes that the geographically distributed sites are co-located;

in the instruction execution system, performing a discrete event-based simulation utilizing virtual contact centers to assign the events to the contact center agents, wherein, in performing the discrete event-based simulation, the instruction execution system assumes that the contact center agents are co-located;

in the instruction execution system, analyzing results of the discrete event-based simulation to determine a relative distribution of the events assigned to the contact center agents at each of the geographically distributed sites;

in the instruction execution system, creating at least one distributed campaign, wherein each distributed campaign includes at least two sub-centers geographically dispersed from a contact center, and wherein each sub-center includes at least one of the contact center resources;

in the instruction execution system, creating at least one distributed queue for each distributed campaign, wherein each distributed queue comprises at least a portion of the events as an input stream to the contact center; and in the instruction execution system, determining recommended allocations of the contact center agents among the geographically distributed sites based on the relative distribution of the events assigned to the contact center agents at each of the geographically distributed sites.

* * * * *